US010857716B2

(12) United States Patent
Chauvin et al.

(10) Patent No.: US 10,857,716 B2
(45) Date of Patent: *Dec. 8, 2020

(54) APPARATUS AND METHOD FOR FABRICATING AND FILLING CONTAINERS

(71) Applicant: DISCMA AG, Zurich (CH)

(72) Inventors: Guillaume Chauvin, Duchess Manor (SG); Damien Kannengiesser, Golbey (FR); Christophe Collin, Fuveau (FR); Jean-Tristan Outreman, Septemes les Vallons (FR); Jean-Louis Pellegatta, Seillons Source d'Argens (FR)

(73) Assignee: Discma AG, Zürich (CH)

( * ) Notice: Subject to any disclaimer, the term of this patent is extended or adjusted under 35 U.S.C. 154(b) by 249 days.

This patent is subject to a terminal disclaimer.

(21) Appl. No.: 15/934,260

(22) Filed: Mar. 23, 2018

(65) Prior Publication Data

US 2018/0229418 A1    Aug. 16, 2018

Related U.S. Application Data

(63) Continuation of application No. 14/652,659, filed as application No. PCT/EP2013/075628 on Dec. 5, 2013, now Pat. No. 9,931,780.

(30) Foreign Application Priority Data

Dec. 19, 2012  (EP) ..................... 12198181

(51) Int. Cl.
*B29C 49/12*   (2006.01)
*B65B 3/12*    (2006.01)
(Continued)

(52) U.S. Cl.
CPC .............. *B29C 49/12* (2013.01); *B29C 49/46* (2013.01); *B65B 3/022* (2013.01); *B65B 3/12* (2013.01);
(Continued)

(58) Field of Classification Search
None
See application file for complete search history.

(56) References Cited

U.S. PATENT DOCUMENTS 9,931,780 B2 *  4/2018  Chauvin ................ B29C 49/12
2012/0207872 A1   8/2012  Lisch et al.

FOREIGN PATENT DOCUMENTS

WO     2012010460 A1    1/2012

* cited by examiner

*Primary Examiner* — Monica A Huson
(74) *Attorney, Agent, or Firm* — Eric J. Sosenko; Jonathan P. O'Brien; Honigman LLP

(57) ABSTRACT

An apparatus for the fabrication of a container, comprising a mold defining the form of said container and container and configured to accommodate a substantially tubular preform, an injection head configured to interface with the preform and establish fluid communication with a cavity thereof; an injection valve configured to selectively permit fluid communication through said injection head, and a stretching rod slideably disposed within the injection head; said apparatus further comprising a displacement plunger being disposed coaxially about and mobile relative to said stretching rod between a retracted position substantially within the injection head and an extended position wherein said displacement plunger projects at least partially from said injection head.

20 Claims, 3 Drawing Sheets

(51) Int. Cl.
  *B65B 39/12* (2006.01)
  *B29C 49/46* (2006.01)
  *B65B 3/02* (2006.01)
  *B65B 3/26* (2006.01)
  *B29L 31/00* (2006.01)
  *B29C 49/06* (2006.01)
  *B29C 49/42* (2006.01)
  *B29C 49/48* (2006.01)
(52) U.S. Cl.
  CPC ................ *B65B 3/26* (2013.01); *B65B 39/12* (2013.01); *B29C 49/06* (2013.01); *B29C 49/4289* (2013.01); *B29C 2049/4294* (2013.01); *B29C 2049/4664* (2013.01); *B29C 2049/4892* (2013.01); *B29L 2031/7158* (2013.01)

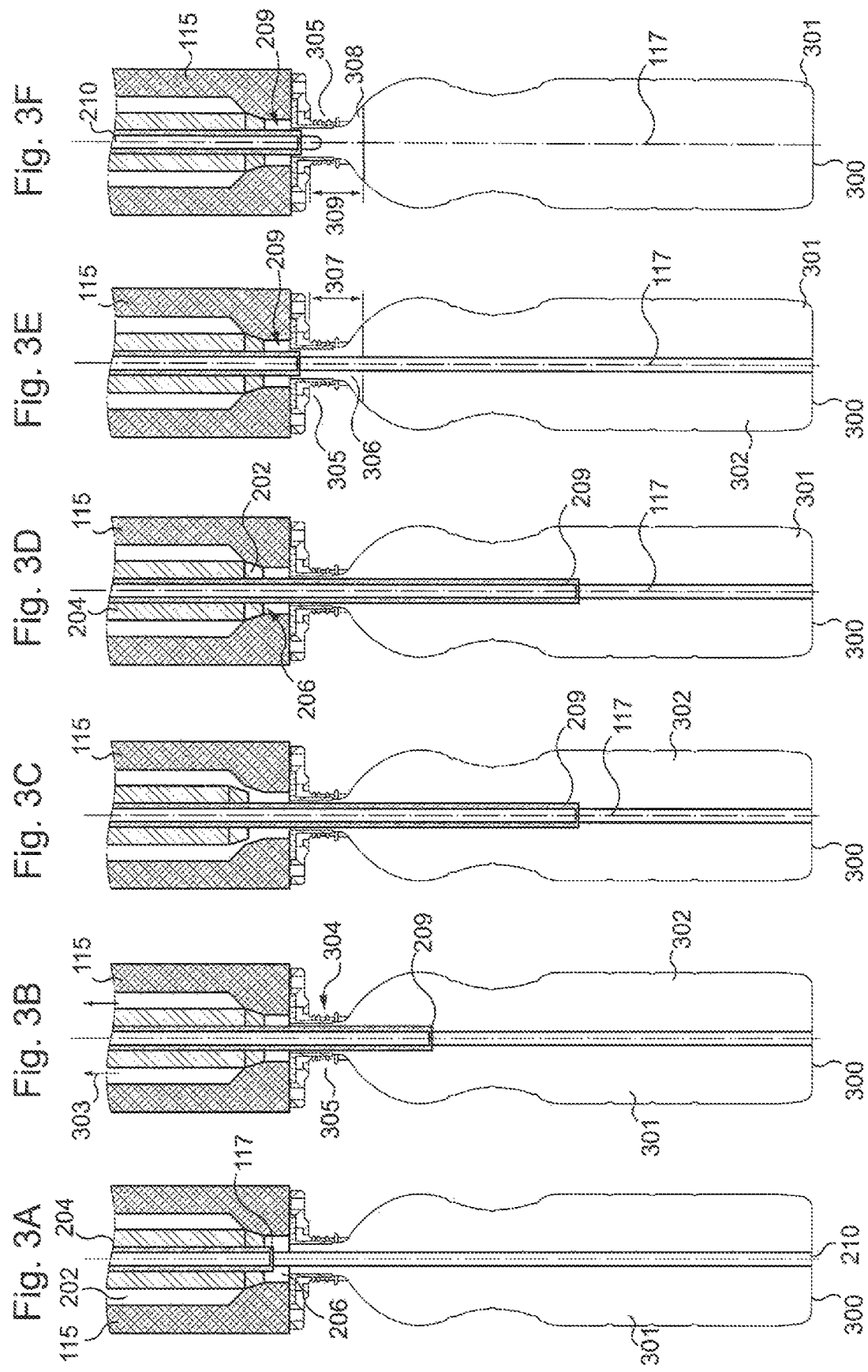

APPARATUS AND METHOD FOR FABRICATING AND FILLING CONTAINERS

CROSS-REFERENCE TO RELATED APPLICATIONS

This application is a continuation of U.S. patent application Ser. No. 14/652,659 filed on Jun. 16, 2015, which is the U.S. national phase of PCT Application No. PCT/EP2013/075628 filed on Dec. 5, 2013, which claims priority to EP Patent Application No. 12198181.5 filed on Dec. 19, 2012, the disclosures of which are herein incorporated by reference in their entirety.

BACKGROUND

1. Field of the Invention

The present invention concerns generally to an apparatus for the fabricating and filling of containers. The invention also relates to a method of employing said apparatus to fabricate and fill containers, as well as the container so produced.

2. Related Technology

It is commonly known in the art of container fabrication to fabricate containers by the stretch blow molding process. In the stretch blow molding process, a substantially tubular parison or "preform" is provided, being fabricated from a thermoplastic and having an open end near a mouth and a closed end opposite the open end. The preform is disposed within a mold having a cavity substantially defining the form and contours of a container.

The preform is expanded into the cavity of the mold by the action of a working fluid injected into the preform under pressure, and by the action of a stretching rod inserted into a mouth of the preform. The pressurized fluid causes the preform to inflate, expanding primarily radially. The stretching rod is advanced into the preform and presses against an opposite interior surface, stretching it longitudinally into the mold.

Conventionally, the pressurized fluid injected during the molding of the container is air, usually heated to facilitate the deformation of the preform. However, it is known to use a liquid as the working fluid, preferably the liquid which is ultimately to be packaged within the container. In this way, the process of forming a container and filling it with a product are effectively combined, realizing great advantages in equipment cost and production efficiency compared to an air-injection stretch blow molding system.

When filling a container with a liquid, it is necessary to leave a small void space at the top of the container. This void space enables the consumer to open the container without spilling any of the liquid contained therein, as well as provides compensation for any thermal expansion of the liquid during storage.

In processes where the fabrication and filling of the container are carried out in separate steps, providing this void space is a relatively trivial matter. In a process so configured, one need only dispense a volume of liquid product into the container during the filling step that is less than the total volume of the container by the desired amount, leaving the necessary void space in the container.

In a combined forming-filling container fabrication process, however, this is not a feasible option. Specifically, in order to ensure that the preform is fully expanded into the cavity of the mold and that all of the contours of the resulting container are fully formed, one must inject a volume of liquid equal to the full, final volume of the container. The resulting container is thus filled to the brim with the liquid product.

When using a combined forming-filling process combined with a stretching step of the preform, the stretching rod does occupy some volume within the container, and retracting it at the completion of the forming-filling process will create a small amount of void space in the container. The void space created by the displacement of the stretching rod, however, is not always sufficient for the prevention of spilling when the container is opened, especially where a particularly thin stretching rod is employed.

Increasing the diameter of the stretching rod will increase the volume of the void space ultimately created in the container; however, the space between the stretching rod and the interior surface of the mouth of the container are coordinately reduced, impeding the injection of the liquid during the forming of the container. It is therefore necessary to remove some of the liquid from the container upon the completion of the injection process.

One solution to this is to remove a small amount of the liquid by suction, in particular by sucking some of the liquid back through the means for injecting it into the preform during the fabrication of the container. In particular, the document WO 2010/003853 A1 describes a stretch blow molding system in which the stretching rod is hollow, and contains at least one port at a distal end through which this extra liquid may be aspirated from the beverage container.

While this system produces acceptable filled containers, it is disadvantageous in several aspects. First, the at least one port in the stretching rod must remain sealed during the injection of the liquid, which increases the complexity of the apparatus and the expense of its manufacture and operation. Furthermore, the channel within the stretching rod is difficult and time-consuming to clean as the apparatus must be at least partially disassembled to give access to the entire channel. In addition, dissolved material in the liquid will tend to form accretions in the narrow channel and ports, a particularly acute problem when the liquid is mineral water. These accretions reduce the flow through the hollow stretching rod, requiring time-consuming cleaning and maintenance to maintain efficient functioning of the apparatus.

It is therefore an object of this invention to provide a method for fabricating and filling a beverage container which accurately provides a void space in a formed and filled container without the disadvantageous aspects of the apparatuses known in the art.

SUMMARY OF THE INVENTION

According, therefore, to a first aspect, the invention is drawn to an apparatus for the fabrication of a container, comprising a mold, said mold comprising a plurality of mold segments substantially defining a mold cavity in the form of a container, and being further configured to accommodate a substantially tubular preform having a closed first end and defining a preform cavity communicating with a mouth at an open second end; an injection head, said injection head configured to interface with the mouth of the preform and establish fluid communication between a liquid supply and said mouth; an injection valve, said injection valve configured to selectively permit fluid communication through said injection head; and a stretching rod slideably disposed within the injection head, said stretching rod being mobile relative to the preform along a longitudinal axis of said preform and configured to press against an interior surface of said preform at the closed first end thereof.

According to the invention, said apparatus is characterized in that it further comprises a displacement plunger, said displacement plunger being disposed coaxially about and mobile relative to said stretching rod between a retracted position substantially within the injection head and an extended position wherein said displacement plunger projects at least partially from said injection head.

This is advantageous in that an apparatus so configured will produce filled containers, each provided with an accurately-measured volume of liquid and void space, without encountering the disadvantageous aspects of the apparatuses known in the prior art. By providing a displacement plunger about the stretching rod, one realizes a very high degree of accuracy in the control over the amount of liquid expelled from the container and, more importantly, the amount of liquid remaining in the container.

Specifically, the extension of the displacement plunger into the container renders the provision of a void space within the container more accurate, in that the volume of liquid expelled from the container is exactly equal to the combined volume of the portions of the stretching rod and displacement plunger which are inserted into the container, the extension of which being controlled with a high degree of precision. This realizes much more accurate results than the apparatuses known in the art which necessarily employ pumps, plumbing, flow meters, etc. in their operation, which each introduce the opportunity for variation and error in the volume of liquid extracted from the container.

Furthermore, the provision of the displacement plunger renders the operation of the apparatus more reliable and economical than those known in the art, in that it eliminates the channel and ports within the stretching rod which are difficult and time-consuming to clean and are prone to clogging from accreted substances.

According to another feature, the injection valve is disposed within the injection head coaxially with a nozzle of said injection head, said injection valve seating in said nozzle when in a closed position.

This is advantageous in that the injection valve is integrated into the injection head. The entirety of the apparatus is thereby rendered more compact while also reducing the volume of the liquid channels of the apparatus between the nozzle of the injection head and the injection valve. The accuracy and responsiveness of the injection head and the flexibility of its disposition within the apparatus are both thereby improved.

According to a feature, the apparatus further comprises a sealing means disposed between the stretching rod and the displacement plunger.

This is advantageous in that the sliding joint between the stretching rod and displacement plunger will the protected from the infiltration of liquid from the container. This will prevent inaccuracies in the provision of the void space due to the improper expulsion of liquid from the container, as well as prevent corrosion and other wear due to the infiltration of the liquid. The accuracy and reliability of the apparatus is thereby improved.

According to a second aspect, the invention is drawn to a method for the fabrication of a container, comprising the steps of providing a substantially tubular preform, said preform having a closed first end and defining a preform cavity communicating with a mouth at an open second end; disposing the preform at least partially within a mold comprised of a plurality of mold segments and being provided with a mold cavity substantially defining the form of a container; positioning an injection head upon the mouth of the preform, said injection head establishing fluid communication between said mouth and a liquid source, an injection valve selectively permitting fluid communication through said injection head; opening the injection valve and injecting a volume of liquid into the preform cavity of the preform after insertion of a stretching rod into the preform cavity through the mouth of the preform has begun, said stretching rod being pressed into an interior surface of the closed first end thereof, said preform being thus induced to expand into the contours of the mold cavity and produce a container; inserting a displacement plunger into said container from a retracted position substantially within the injection head to an extended position projecting at least partially from said injection head, thereby displacing a portion of the volume of liquid and expelling it through said injection head; closing the injection valve, thereby blocking fluid communication between the fluid source and the container; and withdrawing the injection head, stretching rod, and displacement plunger from the container.

This is advantageous in that fabricating a container by such a method will realize the advantages of the apparatus described above in the fabrication and filling of containers. This method produces fabricated and filled containers, ready for sealing, labeling, and distribution, without implicating the complex mechanisms required to remove liquid through a hollow stretching rod, nor the costly and time-consuming maintenance processes to maintain the cleanliness of and unimpeded flow through said hollow stretching rod.

Furthermore, the insertion of a displacement plunger improves the control that may be exercised over the amount of liquid displaced from the container. Specifically, as the diameter of the stretching rod and displacement plunger are known and fixed, one may control the amount of liquid expelled from the container simply by controlling the advancement of the displacement rod into the container. The insertion of the displacement rod will thus obviate any flow-metering or other means for measuring the volume of liquid expelled from the container, at once simplifying the operation of the apparatus and ensuring that a consistent and accurate volume of liquid remains within the containers so produced.

According to a third aspect, the invention is drawn to a container produced by the method as described above. This is advantageous in that such a container will embody the advantages of the method as described above.

Other particularities and advantages of the invention will also emerge from the following description.

BRIEF DESCRIPTION OF THE DRAWINGS

In the accompanying drawings, given by way of non-limiting examples:

FIGS. 3A through 3F are a series of orthogonal section views depicting a container before, during, and after the insertion of a displacement plunger.

DETAILED DESCRIPTION

Figure 1A:
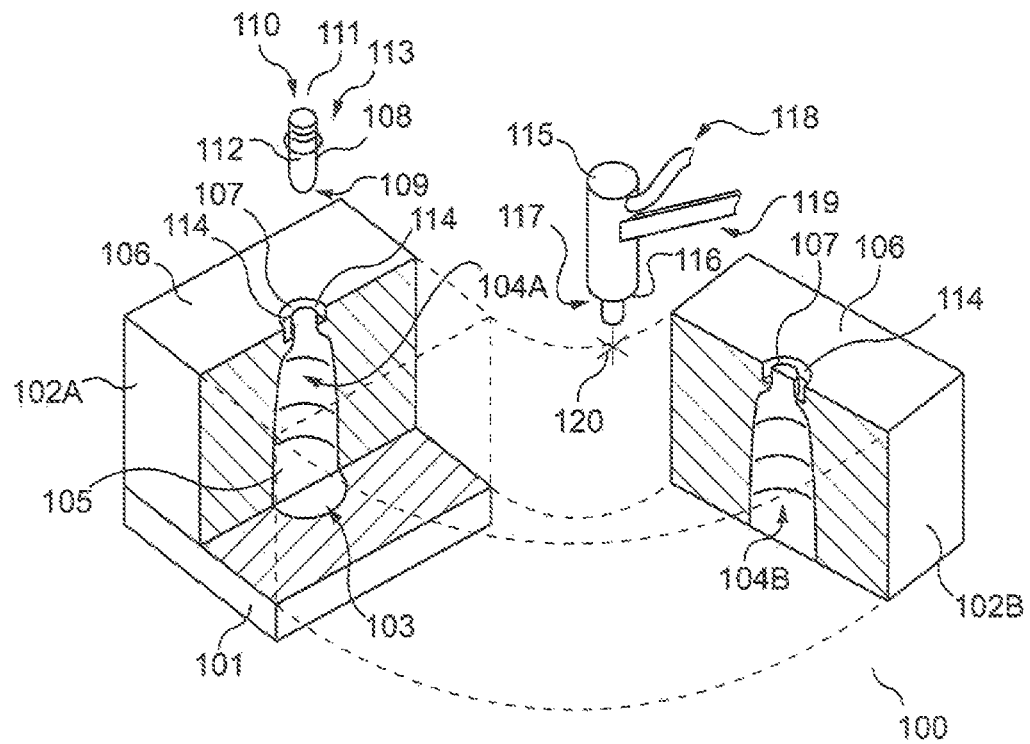
FIGS. 1A and 1B are perspective depictions of an exemplary stretch blow molding apparatus, in a partially-exploded and assembled disposition, respectively.
Figure 1B:
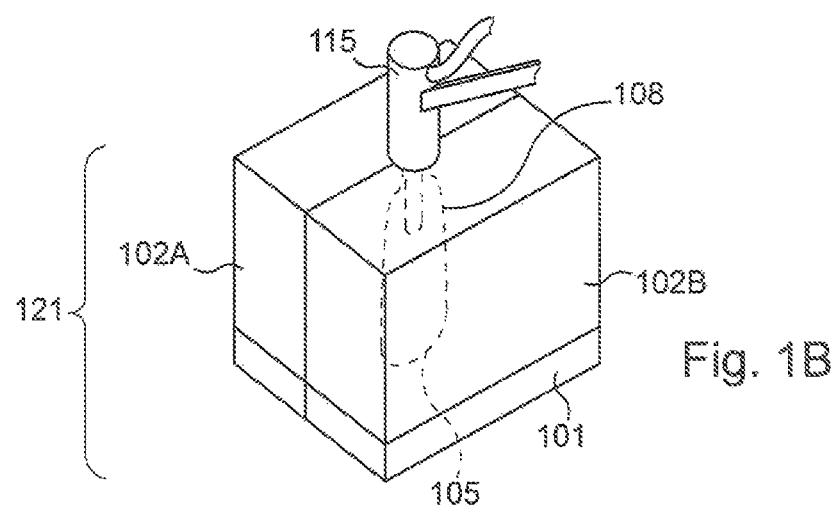

FIGS. 1A and 1B are perspective views of an exemplary stretch blow molding apparatus 100 according to an embodiment of the invention. FIG. 1A depicts the apparatus in a partially-exploded disposition. The apparatus 100 comprises a base mold segment 101 and the two lateral mold segments 102A and 102B. The base mold segment 101 is provided with a base depression 103 substantially defining the base of a container, while the lateral mold segments 102A and 102B are respectively provided with the lateral depressions 104A and 104B, each substantially defining half of the body of a container. The base depression 103 and lateral depressions 104 together form the mold cavity 105, which substantially defines the form of a container.

The lateral depressions 104A and 104B each communicate with a top face 106 of their respective lateral mold segments 102A and 102B, cooperating to form a mold hole 107 communicating with the mold cavity 105. Into the mold hole 107 is disposed a preform 108, which is substantially tube-shaped and comprises a closed end 109 and a mouth 110 at an open end 111 communicating with a preform cavity 112 within said preform 108.

In this embodiment of the invention, the mold segments 101, 102A, and 102B are depicted as substantially independent components, each being capable of a full range of motion independent from the other two. It may be preferable, however, to provide linkages or other such connections between the mold segments so as to restrict their range of motion relative to each other, or to provide that the mold segments are linked together by means such as rails or sliders.

In FIG. 1A the preform 108 is shown removed from the mold cavity 105 for clarity; however, it should be understood that the preform 108 is disposed so that it is substantially within the mold cavity 105. Preferably, the preform 108 is provided with a flange 113, which will rest on the top faces 106 of the lateral mold segments 102. The top faces 106 may be further provided with a preform seat 114 disposed about the mold hole 107, which locates the flange 113 of the preform 108, positioning and centering the preform 108 within the mold cavity 105.

Preferably, the open end 111 of the preform 108 protrudes from the top faces 106 of the lateral mold segments 102A and 102B, while the rest of the preform 108 is thus disposed within the mold cavity 105 defined by the base depression 103 and lateral depressions 104.

The apparatus 100 further comprises an injection head 115. The injection head 115 is provided with a nozzle 116 which is configured to mate with the mouth 110 of the preform 108 and create a fluid-tight seal therewith. The injection head 115 is further provided with a stretching rod 117, here depicted slightly extended from the nozzle 116. The injection head 115 is connected to a fluid supply 118, such that a volume of fluid may be conducted from said fluid supply 118 through the injection head 115 and out the nozzle 116. The fluid supply 118 is controlled by an injection valve, which may be disposed within the injection head 115 as here, or optionally outboard of the injection head, for example in a pumping unit or other such fluid handling system. Furthermore, In FIG. 1A, the injection head 115 is affixed by the arm 119 to a positioning mechanism, such that it may translate in each of the six principal axes 120 and position itself upon the mouth 110 of the preform 108. However, it should be understood that the injection head 115 need not necessarily be so configured: depending on the integration of the molding apparatus 100 into the production line as a whole and the configuration of the molding apparatus in particular, it may only be necessary to provide, for example, a means for the injection head 115 to translate along a vertical axis relative to the mold segments 101 and 102. The exact configuration of the apparatus may be determined by one skilled in the art, according to the particular demands of the implementation.

FIG. 1B depicts the mold apparatus in an assembled disposition, with the mold segments 101, 102A, and 102B brought together in abutment to form the mold 121 which defines the mold cavity 105. The preform 108 is disposed substantially within the mold cavity 105, and the injection head 115 is positioned over the mouth (not shown) of the preform 108 which protrudes from the mold cavity 105. At this point, the injection head 115 is ready to inject a quantity of liquid into the preform 108 and expand it into the contours of the mold cavity 105, forming a container.

Figure 2B:
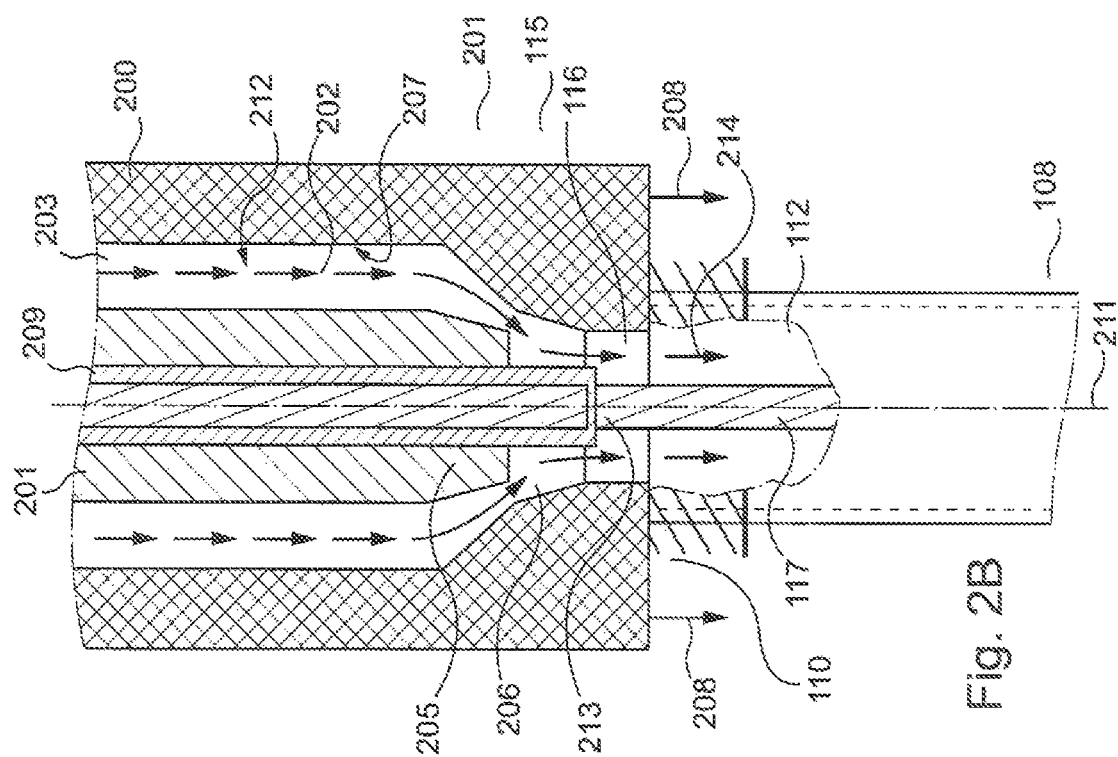
FIGS. 2A and 2B are orthogonal section views of an injection head of the embodiment of FIGS. 1A and 1B, having an injection valve that is closed in FIG. 2A and open in FIG. 2B.
Figure 2A:
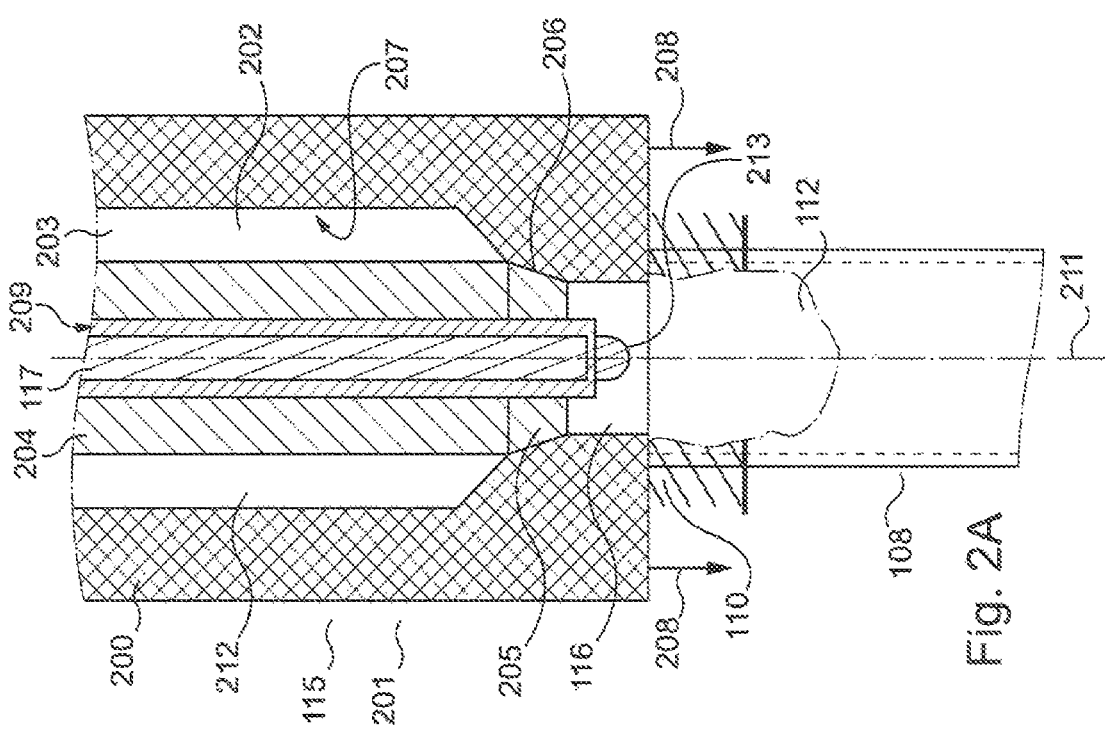

FIGS. 2A and 2B depict a section view of the injection head 115 according to the embodiment of the invention of FIGS. 1A and 1B. FIG. 2A depicts the injection head 115 in a closed state as prior to an injecting step, and FIG. 2B depicts the injection head 115 in an open state as during an injection step.

As shown in FIGS. 2A and 2B, the injection head 115 comprises an outer shell 200, comprising generally a body section 201 and the nozzle 116, the latter being configured to mate with the mouth 110 of the preform 108 and communicate with a preform cavity 112 within said preform 108 as described above. The injection head further comprises the injection valve 202, disposed within the outer shell 200 and defining the injection head cavity 203 between the two. The injection head cavity 203 is thus provided in fluid communication with the nozzle 201.

The injection valve 202 is comprised of the valve body 204 which is provided with a taper 205 at said nozzle 201, and a valve seat 206 formed from a portion of an inner wall 207 of the outer shell 200 configured to mate with the taper 205. When in the closed position as shown in FIG. 2A, the valve body 204 will thus block fluid communication between the injection head cavity 203 and the preform cavity 112.

In some embodiments, it may also be advantageous to provide the injection head 115 with a means for sealing the joint between it and the preform 108, ensuring fluid-tightness between the two. In other embodiments, as here, the fluid-tightness between the injection head 115 and the preform 108 is furnished by the force 208 with which the injection head 115 is pressed into the preform 108.

The injection head 115 is also provided with a displacement plunger 209 about the stretching rod 117. The stretching rod 117 is disposed coaxially within the displacement plunger 209. The stretching rod 117 and displacement plunger 209 are both disposed coaxially within the valve body 204 and are configured to be independently mobile relative to both the valve body 204 and each other. The valve body 204 is itself disposed coaxially with the valve seat 205 and the nozzle 201, such that the entire group of nozzle 201, valve body 204, valve seat 205, displacement plunger 209, and stretching rod 117 are disposed in alignment along the longitudinal axis 211. The displacement plunger 209 and stretching rod 117 are preferably displaced by an electric actuator, though other means such as hydraulic cylinders, pneumatic actuators, and the like may alternately be employed.

FIG. 2A shows the injection head 115 prior to an injecting step. The valve body 204 is seated in the valve seat 206, blocking fluid communication through the injection head 115 and preventing flow of the liquid 212 through the nozzle 201. Both the stretching rod 117 and the displacement plunger 209 are fully retracted within the injection head 115.

Preferably, there is a sealing means 213 disposed at the joint between the stretching rod 117 and the displacement plunger 209. This may take the form of a circumferential rod seal, as here, or alternately other sealing means may be employed as appropriate to the construction of the apparatus.

FIG. 2B shows the injection head 115 during an injecting step. The stretching rod 117 is advanced into the cavity 112. The stretching rod 117 is advanced into the closed end (not shown) of the preform 108 and causes the preform to stretch along the longitudinal axis 211.

Shortly thereafter, the valve body 204 is retracted from the valve seat 206, permitting the liquid 212 to flow through the nozzle 201 of the injection head. The liquid 212 is injected with a flow 214 into the cavity 112 of the preform 108, further expanding the preform 108 and causing it to assume the form of the mold cavity (not shown) in which it is disposed. The displacement plunger 209, however, remains in its retracted position throughout the injecting step.

FIGS. 3A to 3F are a series of section views which detail the operation of the injection head 115 of the embodiment during a process for fabricating and filling a container 300.

FIG. 3A depicts the injection head 115 and container 300 immediately following the completion of its fabrication. The stretch rod 117 has been advanced to its fully-extended position, but the valve body 204 remains retracted from the valve seat 206 and fluid communication is still maintained between the injection nozzle and the container cavity 301 of the container 300. The container 300, having been completely formed during the injection step, is filled with the liquid 302.

FIG. 3B depicts the injection head 115 and container 300 during a step for inserting a displacement plunger 209. The displacement plunger 209 is advanced into the container cavity 301 of the container 300, inducing a portion of the liquid 302 to be expressed from the container cavity 301 and into the injection head 115. The liquid 302 is expressed in a flow 303, which proceeds from the container cavity 301 through an annular gap 304 between the displacement plunger 209 and the mouth 305 of the container 300.

FIG. 3C depicts the injection head 115 and container 300 at the conclusion of the step for inserting the displacement plunger 209. The displacement plunger 209 is in its extended position, having expelled a desired volume of the liquid 302 from the container and leaving the rest therein.

The volume of the liquid 302 which is expelled from the container will vary with the degree to which the displacement plunger 209 is advanced into the cavity 301 of the container 300. One may thus adapt the process to the characteristics of the container sought to be fabricated, in part by altering the extension of the displacement plunger 209.

For instance, the same injection head may be employed to fabricate containers of different volumes by altering the extension of the displacement plunger during the step for inserting the displacement plunger into the container, such that the displacement plunger is extended to a greater degree when fabricating larger containers where a greater volume of liquid must be expressed to provide the proper void space, and to a lesser degree when fabricating smaller containers requiring less expression of liquid.

In any event, however, the volume of liquid expelled from the container 300 will be substantially equal to the combined volume of the portions of the displacement plunger 209 and stretching rod 117 which extend into the cavity 301 of the container 300.

FIG. 3D depicts the injection head 115 and container 300 during a subsequent step for closing the injection valve within the injection head 115. The valve body 204 is advanced into the valve seat 206, thereby preventing fluid communication between the injection head cavity 203 and the container cavity 301. While FIGS. 2A, 2B, and 3A through 3F depict an embodiment where the injection valve is incorporated within the injection head, it should be understood that the injection valve may be positioned elsewhere in the container fabrication apparatus, so long as when it is closed it prevents any further flow of liquid into the container. For instance, it may be advantageous to instead provide the injection valve outboard of the injection head, such as in a liquid reservoir or pumping unit. The exact disposition of the components of the container fabricating apparatus may be determined by one skilled in the art according to the particularities of each installation.

FIG. 3E depicts the injection head 115 and container 300 during a step for withdrawing the injection head 115, displacement plunger 209, and stretching rod 117 from the container cavity 301 of the container 300. The injection head 115 is first slightly withdrawn from the mouth 305 of the container 300, permitting communication between the container cavity 301 and the surrounding atmosphere. The displacement plunger 209 is then subsequently withdrawn from the container cavity 201, returning to its initial, fully-retracted position as depicted in FIG. 2A. The level of the liquid 302 within the container 300 is thus lowered by the distance 307.

FIG. 3F depicts the injection head 115 and container 300 after the completion of the step for withdrawing the injection head 115, displacement plunger 209, and stretching rod 117. Both the displacement plunger 209 and the stretching rod 117 have returned to their initial, fully-retracted positions as depicted in FIG. 2A, leaving the second void space 308. The withdrawal of the stretching rod 209 will cause the liquid to drop further, receding from the mouth 305 of the container 300 by the distance 309.

In an exemplary implementation of the method of the invention, the volume of the void space 308 is approximately 10 percent of the volume of the liquid 302 remaining in the container 300, or 1/11th of the total interior volume of the container itself. However, this may of course be altered according to the characteristics of the particular container being fabricated, by varying the length by which the displacement plunger 209 is inserted into the container cavity 301 of the container 300. In this way, one may exercise a great deal of control over the exact volume of the liquid 302 remaining in the container 300, whatever the size of the container 300.

The container 300 as shown in FIG. 3F is thus filled with the desired volume of liquid 302 and the proper void space 308, and may be conducted to further apparatuses to be sealed or capped, labeled, and/or packaged for distribution.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, the exact sizes and shapes of the elements discussed in the foregoing description may be varied according to the particularities of the application in which the invention is to be employed. For instance, the dimensions and configuration of the injection head, injection valve, displacement plunger, and stretching rod may be adapted to achieve optimal results in any particular application, while still embodying the inventive principle of this invention.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

The invention claimed is:

1. An apparatus for the fabrication of a container from a preform, comprising:
   a mold defining a mold cavity in the form of a container;
   an injection head configured to establish fluid communication between a liquid supply and a mouth of a preform accommodated in the mold;
   an injection valve located within the injection head, the injection valve having a valve body moveable between an open position permitting fluid communication through the injection head and a closed position preventing fluid communication through the injection head;
   a stretching rod slideably disposed within the injection head, the stretching rod being moveable between a retracted position and an extended position, in the extended position the stretching rod projecting from the injection head into the preform; and
   a displacement plunger slideably disposed in the injection head, the displacement plunger being moveable between a retracted position and an extended position, in the extended position the displacement plunger projecting from injection head into the preform.

2. The apparatus of claim 1, wherein the displacement plunger is slideably disposed relative to at least one of the stretching rod and the injection valve.

3. The apparatus of claim 1, wherein the injection valve is disposed within the injection head and is coaxial with a nozzle of the injection head, the injection valve sealingly engaging a portion of the nozzle in the closed position.

4. The apparatus of claim 3, wherein the injection valve seats in a portion of the nozzle in the closed position.

5. The apparatus of claim 1, wherein the displacement plunger extends longitudinally adjacent to the stretching rod.

6. The apparatus of claim 1, wherein a surface of the displacement plunger is coaxial with the stretching rod.

7. The apparatus of claim 1, wherein the displacement plunger is coaxial with the valve body.

8. The apparatus of claim 1, wherein the displacement plunger is coaxial with the stretching rod and the valve body.

9. The apparatus of claim 1, wherein the stretching rod and the displacement plunger are configured to move independently relative to the valve body.

10. The apparatus of claim 1, wherein the stretching rod and the displacement plunger are configured to move independently relative to the each other.

11. A method of fabricating a container from a preform, the method comprising the steps of:
    providing a tubular preform having a closed first end, a mouth at an open second end and a body therebetween defining preform cavity;
    positioning the preform at least partially within a mold defining a mold cavity in the form of a container the mold cavity;
    inserting a stretching rod into the preform cavity;
    injecting a volume of liquid into the preform to expand the preform into conformity with the mold cavity and to produce a container;
    inserting a displacement plunger into the container, the displacement plunger being distinct from the stretching rod and expelling a portion of the volume of liquid from the container; and
    withdrawing the stretching rod and the displacement plunger from the container.

12. The method of claim 11, wherein during insertion of the displacement plunger, the liquid is expelled through an annular gap between the displacement plunger and the mouth.

13. The method of claim 11, further comprising the step of establishing fluid communication between an interior of the container and surrounding atmosphere before withdrawing the displacement plunger from the container.

14. The method of claim 13, wherein the step of establishing fluid communication between an interior of the container and surrounding atmosphere is performed before withdrawing the stretching rod from the container.

15. The method of claim 11, wherein the step of inserting the displacement plunger is done independently of the step of inserting the stretching rod.

16. The method of claim 11, wherein the step of inserting the displacement plunger occurs after beginning the step of injecting the volume of liquid.

17. The method of claim 11, wherein the step of inserting the displacement plunger is done after the step of inserting the stretching rod.

18. The method of claim 11, wherein the step of injecting the volume of liquid begins after beginning the step of inserting the stretching rod.

19. The method of claim 11, wherein step of inserting the displacement plunger is done coaxially relative to the stretching rod.

20. The method of claim 11, wherein during insertion of the displacement plunger, the liquid is expelled through an annular gap defined in part by the displacement plunger.

* * * * *